United States Patent
Muthurajan et al.

(10) Patent No.: US 10,516,692 B2
(45) Date of Patent: Dec. 24, 2019

(54) DETECTION OF EMAIL-RELATED VULNERABILITIES

(71) Applicant: HEWLETT PACKARD ENTERPRISE DEVELOPMENT LP, Houston, TX (US)

(72) Inventors: Sasi Siddharth Muthurajan, Alpharetta, GA (US); Ronald Joseph Sechman, Alpharetta, GA (US)

(73) Assignee: Micro Focus LLC, Santa Clara, CA (US)

( * ) Notice: Subject to any disclaimer, the term of this patent is extended or adjusted under 35 U.S.C. 154(b) by 109 days.

(21) Appl. No.: 15/500,527

(22) PCT Filed: Sep. 29, 2014

(86) PCT No.: PCT/US2014/058144
§ 371 (c)(1),
(2) Date: Jan. 31, 2017

(87) PCT Pub. No.: WO2016/053261
PCT Pub. Date: Apr. 7, 2016

(65) Prior Publication Data
US 2017/0223042 A1    Aug. 3, 2017

(51) Int. Cl.
G06F 21/00    (2013.01)
H04L 29/06    (2006.01)
H04L 12/58    (2006.01)

(52) U.S. Cl.
CPC .......... *H04L 63/1433* (2013.01); *H04L 51/12* (2013.01); *H04L 51/30* (2013.01);
(Continued)

(58) Field of Classification Search
CPC . H04L 63/1433; H04L 51/12; H04L 63/1425; H04L 63/1483; H04L 51/30
(Continued)

(56) References Cited

U.S. PATENT DOCUMENTS 6,785,732 B1    8/2004    Bates et al.
7,325,252 B2 *  1/2008    Bunker et al. .......... G06F 21/00
                                                726/25

(Continued)

FOREIGN PATENT DOCUMENTS

KR    10-2014-0043081           4/2014
WO    WO-2012166120            12/2012
WO    WO-2012166120 A1 * 12/2012    ......... H04L 63/1433

OTHER PUBLICATIONS

Vicente Aguilera Díaz, MX Injections—Capturing and Exploiting Hidden Mail Servers, Dec. 2006, Internet Security Auditors, paragraph 2-5 on p. 9 (Year: 2006).*

(Continued)

*Primary Examiner* — Shin-Hon (Eric) Chen (57) ABSTRACT

Examples relate to detection of email-related vulnerabilities. The examples disclosed herein enable monitoring, at a runtime, application programming interface (API) calls made by a server-based application for the API calls related to at least one of a plurality of email protocols. A request to obtain a first set of data indicating a result of a vulnerability attack may be received from a vulnerability scanner. The examples disclosed herein enable identifying, at the runtime, an API call that has been made based on the vulnerability attack in response to receiving the request. The first set of data may be obtained, at the runtime, based on the API call. The examples disclosed herein further enable providing the first set of data to the vulnerability scanner to detect a vulnerability in the first set of data.

13 Claims, 5 Drawing Sheets

(52) U.S. Cl.
CPC ...... *H04L 63/1425* (2013.01); *H04L 63/1483* (2013.01); *H04L 51/28* (2013.01)

(58) Field of Classification Search
USPC .......................................................... 726/23
See application file for complete search history.

(56) References Cited

U.S. PATENT DOCUMENTS

| | | | |
|---|---|---|---|
| 7,685,639 B1* | 3/2010 | McCorkendale et al. ................... | G06F 17/00 726/24 |
| 7,970,845 B2 | 6/2011 | Yu | |
| 8,347,392 B2* | 1/2013 | Chess et al. ............. | G06F 11/30 726/25 |
| 8,499,354 B1 | 7/2013 | Satish et al. | |
| 8,726,394 B2* | 5/2014 | Maor et al. ............. | G06F 21/00 726/25 |
| 2001/0034847 A1* | 3/2001 | Gaul, Jr. ................... | H04L 9/32 713/201 |
| 2003/0202663 A1* | 10/2003 | Hollis et al. ............. | H04L 9/00 380/282 |
| 2005/0005169 A1* | 1/2005 | Kelekar ................... | H04L 9/00 713/201 |
| 2005/0114652 A1* | 5/2005 | Swedor et al. .......... | H04L 9/00 713/156 |
| 2006/0020814 A1 | 1/2006 | Lieblich et al. | |
| 2010/0050263 A1* | 2/2010 | Weisman ................ | G06F 21/00 726/25 |
| 2010/0138925 A1* | 6/2010 | Barai et al. ............. | G06F 21/00 726/25 |
| 2010/0293616 A1* | 11/2010 | Young .................... | G06F 21/00 726/25 |
| 2011/0307955 A1 | 12/2011 | Kaplan et al. | |
| 2012/0260344 A1* | 10/2012 | Maor .................. | G06F 11/3688 726/25 |
| 2012/0304299 A1 | 11/2012 | Kelekar | |
| 2013/0160131 A1* | 6/2013 | Madou ................ | G06F 11/3688 726/25 |
| 2014/0082739 A1* | 3/2014 | Chess .................. | G06F 21/577 726/25 |

OTHER PUBLICATIONS

J. Klensin, Request for Comments: 5321 Simple Mail Transfer Protocol, Oct. 2008, Internet Engineering Task Force (IETF), Sections 2.3.2 and 3.1 (Year: 2008).*

Joao Antunes et. al., Vulnerability Discovery with Attack Injection, May/Jun. 2010, IEEE, IEEE Transactions on Software Engineering vol. 36 and No. 3, Section 4.1 on p. 360 (Year: 2010).*

Ahmed Mohamed, PHP Email Injection Example, May 9, 2013, Infosec Institute, all (Year: 2013).*

Balduzzi, M., "Automated Detection of HPP Vulnerabilities in Web Applications", Aug. 27, 2014, <media.blackhat.com/bh-us-11/Balduzzi/BH_US_11_Balduzzi_HPP_WP.pdf>, 19 pages.

Suhina, Exploiting and Automated Detection of Vulnerabilities in Web Applications, Nov. 13, 2007, zemris.fer.hr/~sgros/publications/diploma_thesis/suhina_vanja_seminar.pdf, 29 pp.

* cited by examiner

DETECTION OF EMAIL-RELATED VULNERABILITIES

BACKGROUND

Because the Internet enables rapid and widespread distribution of data, electronic correspondences such as electronic mail ("email") are becoming a popular means for communication. Electronic correspondences are widely used as a common mode of communication for both personal and professional use. Sensitive information such as medical information, financial information, legal documents, and even government correspondences are electronically exchanged over the Internet.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Because the Internet enables rapid and widespread distribution of data, electronic correspondences such as electronic mail ("email") are becoming a popular means for communication. Electronic correspondences are widely used as a common mode of communication for both personal and professional use. Sensitive information including medical information, financial information, legal documents, and even government correspondences are electronically exchanged over the Internet. Electronic correspondences may be vulnerable to many types of attacks, which may seriously endanger the security of sensitive information. One example of a vulnerability related to email communications may be a vulnerability against an email header injection (e.g., similar to Carriage Return Line Feed (CRLF) injection). This type of vulnerability may occur in a header section of an email. The header section contains various fields such as "To," "From," "Subject," "CC," etc. If the "Subject" field is not validated, the email header injection may be used to inject another "To" field below the "Subject" field. In this way, the email at issue may be sent to the original recipient (e.g., intended by the sender of the email) and the injected recipient (e.g., unintended by the sender of the email).

The vulnerability related to the email header injection may be detected through manual testing. A human tester may try to inject an additional "To" field that would send an email to the tester himself. Whether the tester actually receives that email is the only way to determine the presence or absence of the vulnerability against the email header injection. Even when an automated tool is used, the presence of the vulnerability may be confirmed only when the email is received by the injected recipient. In other words, the email header injection vulnerability may be detected only at the recipient's end. Moreover, these approaches may be applicable to the vulnerability related to the email header injection but not other types of email-related vulnerabilities. Other types of email-related vulnerabilities may relate to an email command injection, a sensitive information disclosure, an insecure email connection, and various other types of email-related vulnerabilities.

Examples disclosed herein address these technical issues by detecting email-related vulnerabilities that may be present in any data communicated using at least one email protocol, including, but not being limited to, outgoing messages, incoming messages, email commands or instructions to an email server, and/or email connections. The email protocols may be Transmission Control Protocol and the Internet Protocol ("TCP/IP protocols") used for mail delivery, which may include, but not be limited to, Simple Mail Transfer Protocol (SMTP), Internet Message Access Protocol (IMAP), and/or Post Office Protocol (POP3).

The examples disclosed herein enable monitoring, at a runtime, application programming interface (API) calls made by a server-based application for the API calls related to at least one of a plurality of email protocols. A request to obtain a first set of data indicating a result of a vulnerability attack may be received from a vulnerability scanner. The examples disclosed herein enable identifying, at the runtime, an API call that has been made based on the vulnerability attack in response to receiving the request. The first set of data may be obtained, at the runtime, based on the API call. The examples disclosed herein further enable providing the first set of data to the vulnerability scanner to detect a vulnerability in the first set of data.

Figure 1:
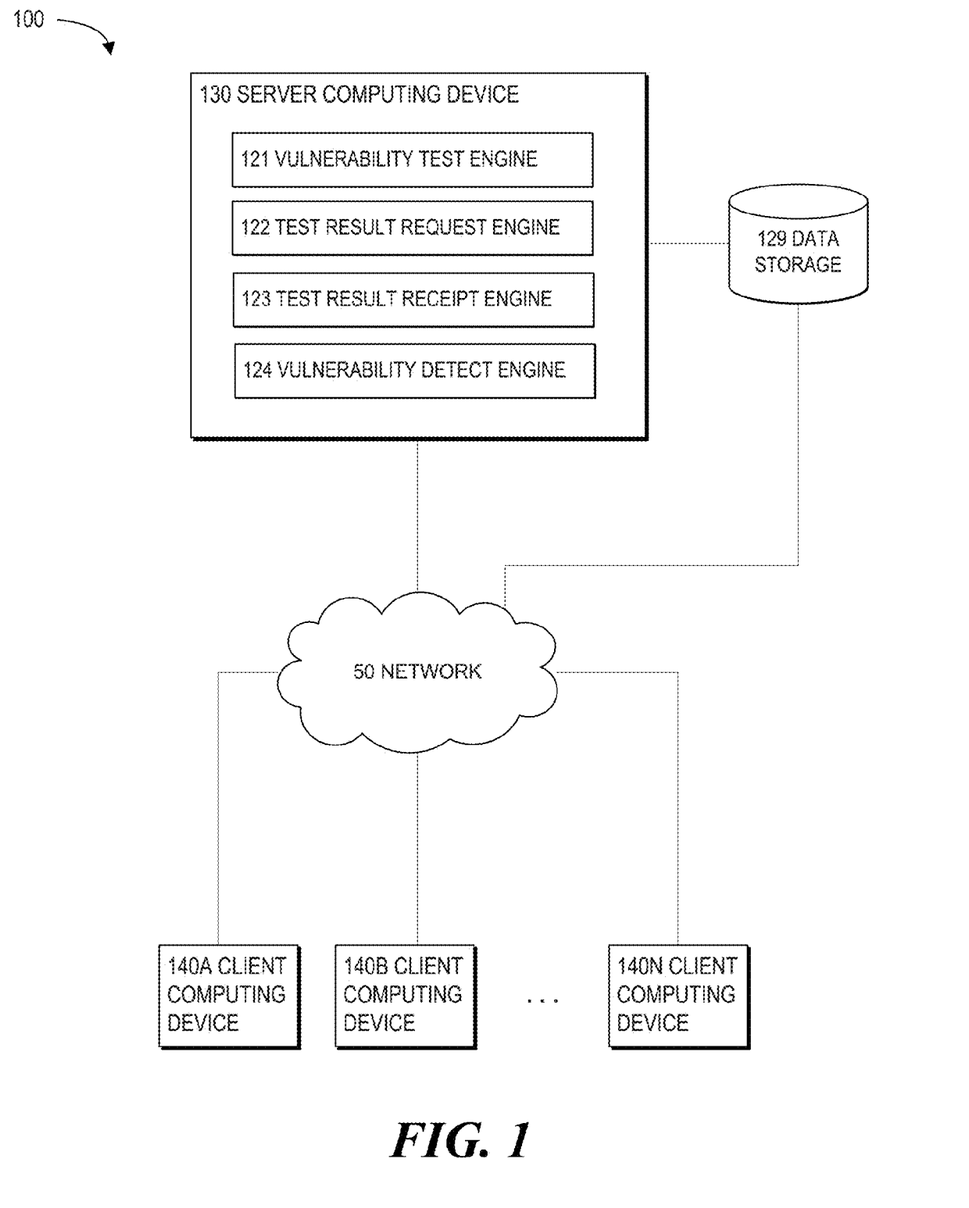
FIG. 1 is a block diagram depicting an example system comprising various components including a client computing device in communication with a server computing device for detecting email-related vulnerabilities.

FIG. 1 is a block diagram depicting an example system 100 comprising various components including a client computing device in communication with a server computing device for detecting email-related vulnerabilities.

The various components may include client computing devices 140 (illustrated as 140A, 140B, . . . , 140N) and a server computing device 130. Each client computing device 140A, 140B, . . . , 140N may communicate requests to and/or receive responses from server computing device 130. Server computing device 130 may receive and/or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of computing devices.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, system 100 and the various components described herein may be implemented in hardware and/or a combination of hardware and programming that configures hardware. Furthermore, in FIG. 1 and other Figures described herein, different numbers of components or entities than depicted may be used.

Server computing device 130 may comprise a vulnerability test engine 121, a test result request engine 122, a test result receipt engine 123, a vulnerability detect engine 124, and/or other engines. The term "engine," as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function. All or part of the functionality of engines (illustrated in FIGS. 1-2) may co-exist in a single server computing device or be distributed among multiple server computing devices.

Vulnerability test engine 121 may perform a vulnerability test on a first set of data. The first set of data may include, for example, outgoing messages (e.g., an outgoing email, an outgoing Short Message Service (SMS), an outgoing Multimedia Messaging Service (MMS), and/or other outgoing electronic correspondences), incoming messages (e.g., an incoming email, an incoming Short Message Service (SMS), an incoming Multimedia Messaging Service (MMS), and/or other incoming electronic correspondences), application requests made to a server-based application (e.g., a request to send a message such as an email, SMS, etc., a request to retrieve a message such as an email, SMS, etc., a request to open a connection with an email server, etc.), instructions to an email server, and/or other information that may be retrieved from API calls made by the server-based application in response to various application requests.

Figure 3:
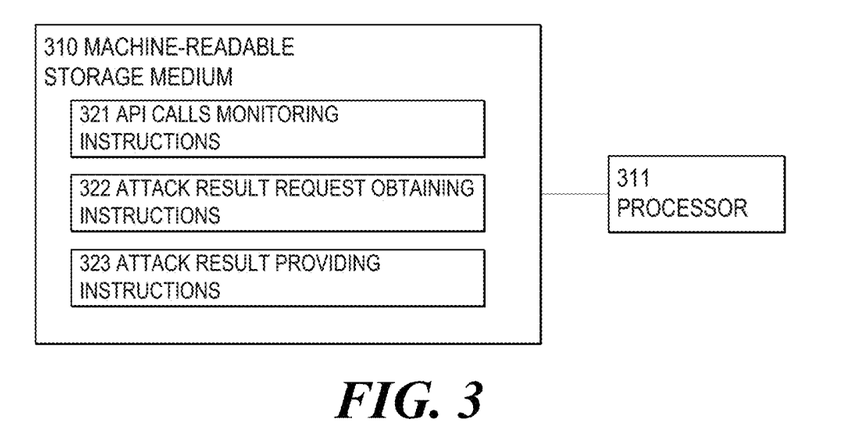
FIG. 3 is a block diagram depicting an example machine-readable storage medium comprising instructions executable by a processor for detecting email-related vulnerabilities.

In some implementations, the first set of data may be collected by a runtime agent that may monitor API calls made by the server-based application in response to a crawl request, which is discussed in detail with respect to FIG. 3. In some implementations, the first set of data may be a set of training data that may be used to test various email-related vulnerabilities in the server-based application. The first set of data may be stored in a data storage (e.g., a data storage 129).

The server-based application may be, for example, a web application that allows a user to access and/or interact with their email through the use of a web browser. Examples of a web-based email application may include Gmail and Yahoo! Mail. The web application may be in communication with at least one email server such as a SMTP server (e.g., for sending emails), an IMAP server (e.g., for sending and/or retrieving emails), a POP3 server (e.g., for sending and/or retrieving emails), or other types of email servers.

The vulnerability test may include an active test and/or a passive test. For example, the active test may include various hacking attacks such as a header injection, a command injection, and/or other hacking attacks that may be made to the first set of data. A result of the hacking attacks (e.g., a second set of data) may be inspected to determine whether a vulnerability is detected in the result of the hacking attacks. On the other hand, the passive test may include, for example, a test to determine whether sensitive information (e.g., that is unencrypted) is found in the first set of data (e.g., outgoing and/or incoming messages). Another example of the passive test may be a test to determine whether a connection with an email server is insecure based on the first set of data (e.g., information related to an application request to open a connection with the email server).

The email header injection (e.g., similar to Carriage Return Line Feed (CRLF) injection) may manipulate a header section of an outgoing email. The header section contains various fields such as "To," "From," "Subject," "CC," etc. If the "Subject" field is not validated, the header injection may be used to inject another "To" field below the "Subject" field. In this way, the email at issue may be sent to the original recipient (e.g., intended by the sender of the email) and the injected recipient (e.g., unintended by the sender of the email). In the case of the email header injection, if the result of the email header injection attack, when inspected, indicates that the header has been indeed modified by the injection attack to include the injected recipient, it may be determined that a vulnerability against the email header injection is detected. Such a vulnerability can be used as a spam relay that makes the email to be sent from the victim's server, making it difficult to trace back to the spammer.

The email command injection (e.g., similar to a CRLF injection) may inject a command (e.g., SMTP, IMAP, and/or POP3 commands made to corresponding email servers) into an application request to execute the command in the corresponding email server. In the case of the email command injection, if the command is executed in the email server, a vulnerability against the email command injection may be detected.

The first set of data may contain sensitive information in cleartext (e.g., unprotected or unencrypted). Such a sensitive information disclosure may occur, for example, when a password (e.g., a reset password) is included in the first set of data (e.g., outgoing and/or incoming messages). The first set of data may be inspected to determine whether such sensitive information is found. If such sensitive information is found, a vulnerability may be detected.

A vulnerability test to determine whether a connection with an email server is insecure may be performed on the first set of data. The first set of data may include an application request to open a connection with the email server and/or other information related to an application request to open a connection with the email server such as information from the API call (e.g., connection opening calls that may indicate the email server's port and/or protocol being used to connect) made by the server-based application in response to the application request. In order to provide transport layer security for connections to email servers, their corresponding Secure Sockets Layer (SSL) versions (e.g., SMTPS, IMAPS, POP3S, etc.) have been introduced. One way of testing the security of the connection may, therefore, be to determine whether the connection is made over SSL (e.g., secure connection) or non-SSL (e.g., insecure connection).

Test result request engine 122 may generate a request to obtain a second set of data indicating a result of the vulnerability test (e.g., active tests) and/or sends the request to obtain the second set of data to a runtime agent. The runtime agent may monitor, at a runtime, API calls made by the server-based application for the API calls related to at least one of a plurality of email protocols. For example, the runtime agent may identify an API call related to (and/or made by the server-based application in response to) the vulnerability test (performed by vulnerability test engine 121). The runtime agent may retrieve the second set of data based on this identified API call. The second set of data may include, for example, incoming and/or outgoing messages (e.g., raw emails, SMS messages, etc.) made in response to the header injection attack, a result indicating whether the injected command has been executed by the email server in response to the command injection attack, and/or other information that may be retrieved from the API call.

Test result receipt engine 123 may receive, from the runtime agent, the second set of data. The second set of data, in some implementations, may be stored in the data storage (e.g., data storage 129).

Vulnerability detect engine 124 may determine whether a vulnerability is detected in the second set of data. In doing so, vulnerability detect engine 124 may inspect the second set of data to determine whether the vulnerability exists in the second set of data. For example, in the case of the email header injection, if the second set of data, when inspected, indicates that the header section has been indeed modified by the header injection attack to include the injected recipient (e.g., that the additional recipient appears in the header section), it may be determined that a vulnerability against the email header injection is detected. In the case of the email command injection, if the second set of data indicates that the injected command has been executed in the email server, a vulnerability against the email command injection may be detected.

Vulnerability detect engine 124 may determine whether a vulnerability is detected in the first set of data. In doing so, vulnerability detect engine 124 may inspect the first set of data to determine whether the vulnerability exists in the first set of data. For example, in the case of the sensitive information disclosure, vulnerability detect engine 124 may inspect the first set of data (e.g., a body section of the first set of data that comprises an email message) to determine whether sensitive information that is unencrypted is found in the first set of data. If such sensitive information is found, a vulnerability against the sensitive information disclosure may be detected. In another example, in the case of the insecure connection, vulnerability detect engine 124 may inspect the first set of data to determine whether a connection with an email server is insecure. The first set of data may include an application request to open a connection with the email server and/or other information related to an application request to open a connection with the email server such as information from the API call (e.g., connection opening calls that may indicate the email server's port and/or protocol being used to connect) made by the server-based application in response to the application request. In order to provide transport layer security for connections to email servers, their corresponding Secure Sockets Layer (SSL) versions (e.g., SMTPS, IMAPS, POP3S, etc.) have been introduced. One way of testing the security of the connection may, therefore, be to determine whether the connection is made over SSL (e.g., secure connection) or non-SSL (e.g., insecure connection).

In performing their respective functions, engines 121-124 may access data storage 129 and/or other suitable database(s). Data storage 129 may represent any memory accessible to server computing device 130 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Server computing device 130 may access data storage 129 locally or remotely via network 50 or other networks.

Data storage 129 may include a database to organize and store data. Database 129 may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
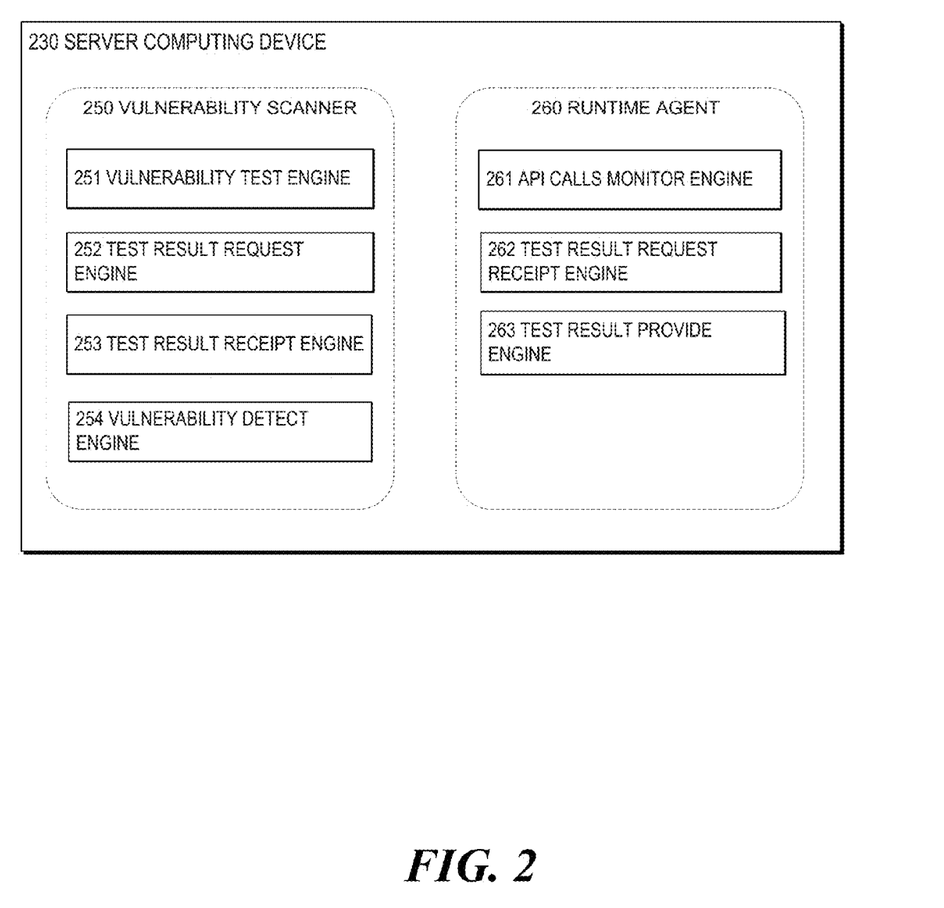
FIG. 2 is a block diagram depicting an example server computing device for detecting email-related vulnerabilities.

FIG. 2 is a block diagram depicting an example server computing device 230 for detecting email-related vulnerabilities. Server computing device 230, although depicted as a single device, may include any number of computing devices. In the example depicted in FIG. 2, a vulnerability scanner 250 and a runtime agent 260 may co-exist in a single server computing device or may exist in different server computing devices.

Vulnerability scanner 250 may comprise a vulnerability test engine 251, a test result request engine 252, a test result receipt engine 253, and a vulnerability detect engine 254, and/or other engines. Engines 251-254 represent engines 121-124, respectively. In some implementations, vulnerability scanner 250 may be, for example a blackbox vulnerability scanner that may be used to find security vulnerabilities in web applications in an automated fashion. The blackbox vulnerability scanner may test any web application regardless of the server-side language. In other words, the blackbox vulnerability scanner may automatically test the server-side application for security vulnerabilities, without access to source code used to build the application.

Runtime agent 260 may comprise an API calls monitor engine 261, a test result request receipt engine 262, a test result provide engine 263, and/or other engines. Runtime agent 260 may be responsible for observing, at a runtime, the values that are being passed to and from various functions in the server-based application including application requests to the application and/or API calls made by the application.

API calls monitor engine 261 may monitor API calls made by the server-based application for the API calls related to at least one of the plurality of email protocols. During monitoring, API calls monitor engine 261 may identify the API calls that are being sent using at least one of the plurality of email protocols. For example, API calls monitor engine 261 may identify an API call made based on at least one of SMTP, IMAP, POP3, and other email-specific protocols.

Test result request receipt engine 262 may receive, from vulnerability scanner 250 (e.g., test result request engine 252), a request to obtain a set of data indicating a result of a vulnerability test (e.g., an active test such as a header injection and a command injection). In response to the request, test result request receipt engine 262 may identify an API call related to (and/or made by the server-based application in response to) the vulnerability test (performed by vulnerability test engine 251). The runtime agent may retrieve the set of data indicating the result of the vulnerability test based on this identified API call. The set of data may include, for example, incoming and/or outgoing messages (e.g., raw emails, SMS messages, etc.) made in response to the header injection attack, a result indicating whether the injected command has been executed by the email server in response to the command injection attack, and/or other information that may be retrieved from the API call.

Test result provide engine 263 may provide the set of data indicating the result of the vulnerability test to vulnerability scanner 250 to detect a vulnerability in the set of data (by vulnerability detect engine 254).

FIG. 3 is a block diagram depicting an example machine-readable storage medium 310 comprising instructions executable by a processor for detecting email-related vulnerabilities.

In the foregoing discussion, engines 261-263 were described as combinations of hardware and programming. Engines 261-263 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements functionality of engines 261-263.

In FIG. 3, the executable program instructions in machine-readable storage medium 310 are depicted as API calls monitoring instructions 321, attack result request obtaining instructions 322, and attack result providing instructions 323. Instructions 321-323 represent program instructions that, when executed, cause processor 311 to implement functionality of engines 261-263, respectively.

Figure 4:
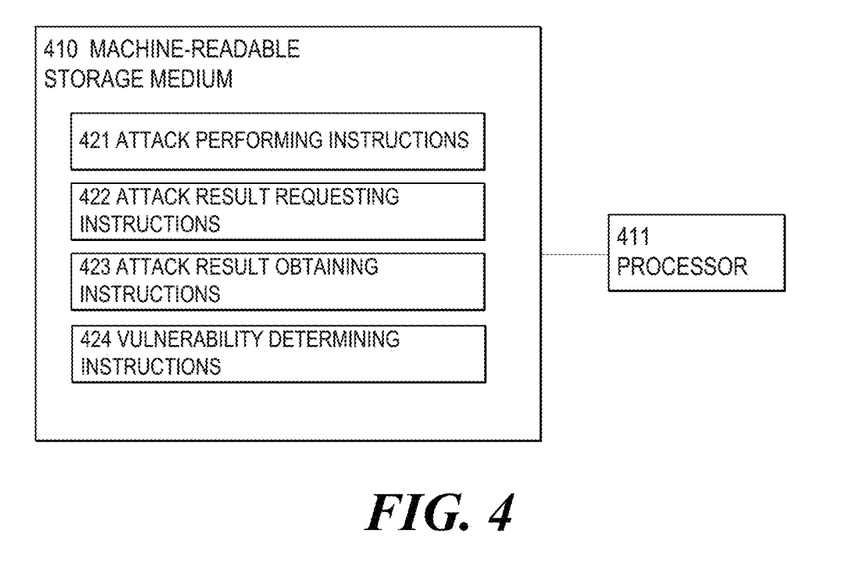
FIG. 4 is a block diagram depicting an example machine-readable storage medium comprising instructions executable by a processor for email-related vulnerabilities.

FIG. 4 is a block diagram depicting an example machine-readable storage medium 410 comprising instructions executable by a processor for detecting email-related vulnerabilities.

In the foregoing discussion, engines 121-124 were described as combinations of hardware and programming. Engines 121-124 may be implemented in a number of fashions. Referring to FIG. 4, the programming may be processor executable instructions 421-424 stored on a machine-readable storage medium 410 and the hardware may include a processor 411 for executing those instructions. Thus, machine-readable storage medium 410 can be said to store program instructions or code that when executed by processor 411 implements functionality of engines 121-124.

In FIG. 4, the executable program instructions in machine-readable storage medium 410 are depicted as attack performing instructions 421, attack result requesting instructions 422, attach result obtaining instructions 423, and vulnerability determining instructions 424. Instructions 421-424 represent program instructions that, when executed, cause processor 411 to implement functionality of engines 121-124, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement functionality of engines 261-263 (or engines 121-124). In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-323, and/or other instructions. As an alternative or in addition to retrieving and executing instructions, processor 311 may include at least one electronic circuit comprising a number of electronic components for performing the functionality of at least one of instructions 321-323, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-424, and/or other instructions. As an alternative or in addition to retrieving and executing instructions, processor 411 may include at least one electronic circuit comprising a number of electronic components for performing the functionality of at least one of instructions 421-424, and/or other instructions.

Figure 5:
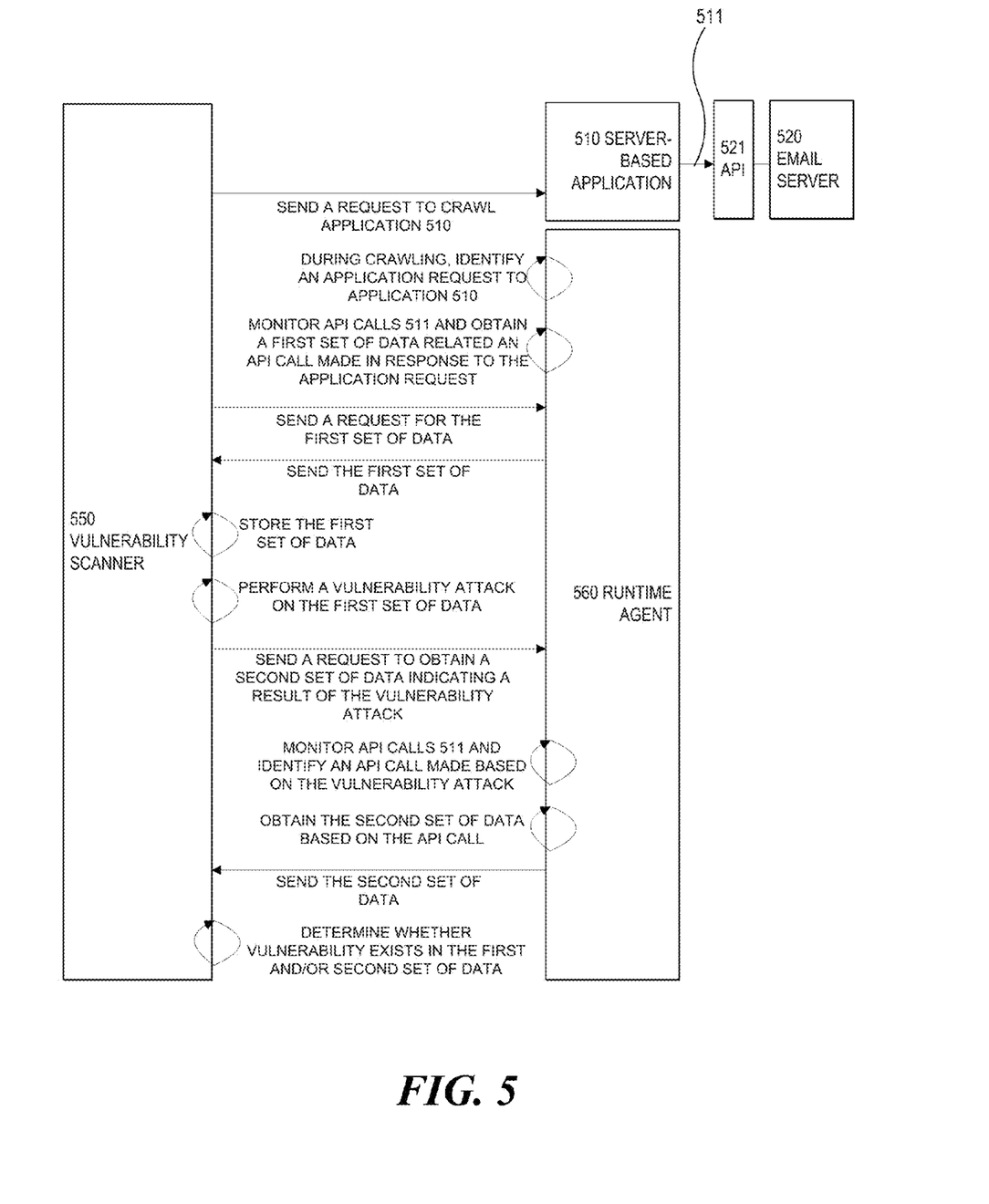
FIG. 5 is a flow diagram depicting an example data flow for detecting email-related vulnerabilities.

FIG. 5 is a flow diagram depicting an example data flow 500 for detecting email-related vulnerabilities.

A vulnerability scanner 550, a server-based application 510, a runtime agent 560, and an email server 520 (and its API 521) may co-exist in a single server computing device or may exist in different server computing devices. For example, server-based application 510, runtime agent 560, and email server 520 may be located in a first server computing device while vulnerability scanner 550 may exist in a second server computing device in communication with the first server computing device.

Vulnerability scanner 550 may send a request to crawl server-based application 510, which may cause crawling of server-based application 510 (e.g., following links, executing scripts, etc.). During crawling, runtime agent 560 may identify an application request to server-based application 510. Examples of the application request may include a request to send a message such as an email, SMS, etc., a request to retrieve a message such as an email, SMS, etc., and/or a request to open a connection with an email server.

Runtime agent 560 may monitor, at a runtime, API calls 511 (e.g., made by server-based application 510 to API 521 of email server 520) to identify API calls 511 related to at least one of a plurality of email-protocols. Runtime agent 560 may obtain a first set of data related to an API call made in response to the identified application request. For example, if the identified application request is an HTTP request to send an email, runtime agent 560 may monitor and/or identify an API call corresponding to the HTTP request to send the email. Runtime agent 560 may retrieve and/or obtain the first set of data (e.g., outgoing email, instructions to a SMTP server, etc.) based on the API call corresponding to the HTTP request to send the email. In another example, if the identified application request is a HTTP request to retrieve an email, runtime agent 560 may monitor and/or identify an API call corresponding to the HTTP request to retrieve the email. Runtime agent 560 may retrieve and/or obtain the first set of data (e.g., incoming email, instructions to an IMAP server, etc.) based on the API call corresponding to the HTTP request to retrieve the email. In yet another example, if the identified application request is a request to open a connection with an email server, runtime agent 560 may monitor and/or identify an API call corresponding to the request to open the connection with the email server. Runtime agent 560 may retrieve and/or obtain the first set of data (e.g., details of the SMTP connection) based on the API call corresponding to the request to open the connection with the email server.

Vulnerability scanner 550 may send a request for the first set of data to runtime agent 560. Runtime agent 560 may send the first set of data to vulnerability scanner 550 that may store the first set of data in a data storage coupled to vulnerability scanner 550 (e.g., data storage 129 of FIG. 1).

Vulnerability scanner 550 may perform a vulnerability attack on the first set of data. The vulnerability attack may comprise various hacking attacks such as a header injection, a command injection, and/or other hacking attacks that may be made to the first set of data.

Vulnerability scanner 550 may generate and/or send a request to obtain a second set of data indicating a result of the vulnerability attack to runtime agent 560. Runtime agent 560 may monitor, at a runtime, API calls made by server-based application 510 for the API calls related to at least one of the plurality of email protocols. For example, runtime agent 560 may identify an API call related to (and/or made by server-based application 510 in response to) the vulnerability attack (performed by vulnerability scanner 550). Runtime agent 560 may obtain the second set of data based on this identified API call. The second set of data may include, for example, incoming and/or outgoing messages (e.g., raw emails, SMS messages, etc.) made in response to the header injection attack, a result indicating whether the injected command has been executed by the email server in response to the command injection attack, and/or other information that may be obtained from the API call. Runtime agent 560 may send the second set of data to vulnerability scanner 550.

Vulnerability scanner 550 may determine whether a vulnerability exists in the first and/or second set of data.

In some implementations, vulnerability scanner 550 may determine whether a vulnerability exists in the first set of data. In doing so, vulnerability scanner 550 may inspect the first set of data to determine whether the vulnerability exists in the first set of data. For example, vulnerability scanner 550 may inspect the first set of data (e.g., an outgoing or incoming message) to determine whether sensitive information that is unencrypted is found in the first set of data. If such sensitive information is found, a vulnerability against the sensitive information disclosure may be detected. In another example, vulnerability scanner 550 may inspect the first set of data to determine whether a connection with an email server is insecure. The first set of data may include an application request to open a connection with the email server and/or other information related to an application request to open a connection with the email server such as information from the API call (e.g., connection opening calls that may indicate the email server's port and/or protocol being used to connect) made by the server-based application in response to the application request. In order to provide transport layer security for connections to email servers, their corresponding Secure Sockets Layer (SSL) versions (e.g., SMTPS, (MAPS, POP3S, etc.) have been introduced. One way of testing the security of the connection may, therefore, be to determine whether the connection is made over SSL (e.g., secure connection) or non-SSL (e.g., insecure connection).

In some implementations, vulnerability scanner 550 may determine whether a vulnerability exists in the second set of data. In doing so, vulnerability scanner 550 may inspect the second set of data to determine whether the vulnerability exists in the second set of data. For example, in the case of the email header injection, if the second set of data, when inspected, indicates that the header section has been indeed modified by the header injection attack to include the injected recipient (e.g., that the additional recipient appears in the header section), it may be determined that a vulnerability against the email header injection is detected. In the case of the email command injection, if the second set of data indicates that the injected command has been executed in the email server, a vulnerability against the email command injection may be detected.

Figure 6:
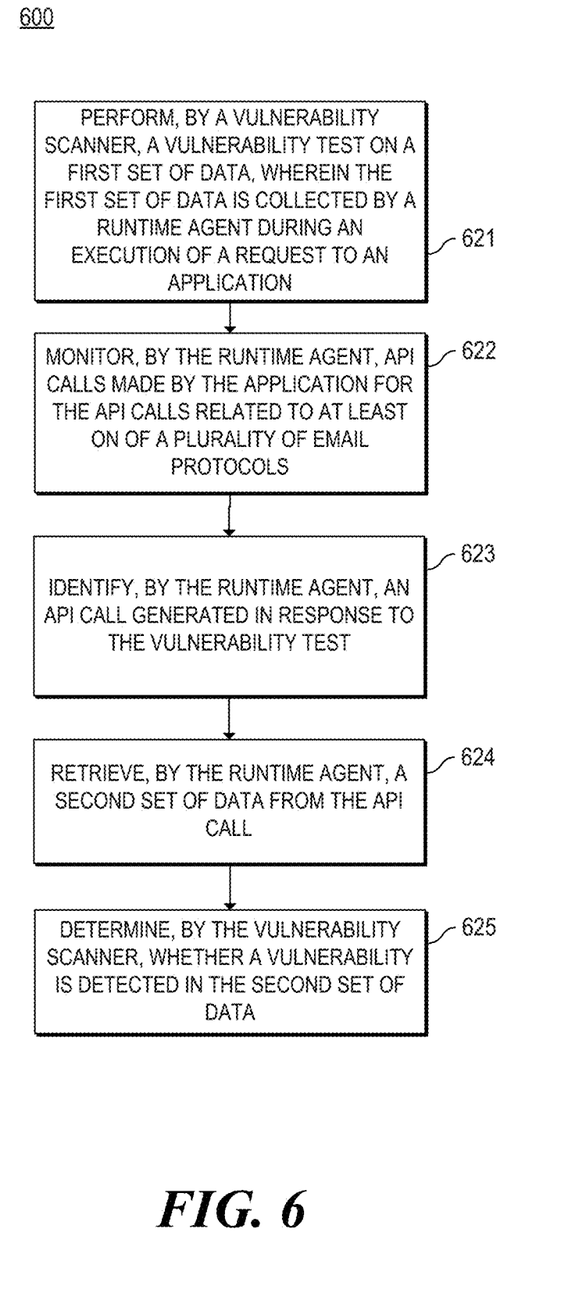
FIG. 6 is a flow diagram depicting an example method for detecting email-related vulnerabilities.

FIG. 6 is a flow diagram depicting an example method 600 for detecting email-related vulnerabilities. The various processing blocks and/or data flows depicted in FIG. 6 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 600 as illustrated (and described in greater detail below) is meant be an example and, as such, should not be viewed as limiting. Method 600 may be implemented in the form of executable instructions stored on a machine-readable storage medium, such as storage medium 310, and/or in the form of electronic circuitry.

Method 600 may start in block 621 where by a vulnerability scanner performs a vulnerability test on a first set of data. The first set of data may be collected by a runtime agent during an execution of a request to an application. In some implementations, the first set of data may be collected by the runtime agent in response to a crawl request from the vulnerability scanner (discussed herein in detail with respect to FIG. 3). The vulnerability test may include an active test and/or a passive test. For example, the active test may include various hacking attacks such as a header injection, a command injection, and/or other hacking attacks that may be made to the first set of data. A result of the hacking attacks (e.g., a second set of data) may be inspected to determine whether a vulnerability is detected in the result of the hacking attacks. On the other hand, the passive test may include, for example, a test to determine whether sensitive information (e.g., that is unencrypted) is found in the first set of data (e.g., outgoing and/or incoming messages). Another example of the passive test may be a test to determine whether a connection with an email server is insecure based on the first set of data (e.g., information related to an application request to open a connection with the email server).

In block 622, method 600 may include monitoring, by the runtime agent, API calls made by the application for the API calls related to at least one of a plurality of email protocols. In block 623, method 600 may include identifying, by the runtime agent, an API call generated in response to the vulnerability test. The runtime agent may retrieve a second set of data from this identified API call (block 624). The second set of data may include, for example, incoming and/or outgoing messages (e.g., raw emails, SMS messages, etc.) made in response to the header injection attack, a result indicating whether the injected command has been executed by the email server in response to the command injection attack, and/or other information that may be retrieved from the API call.

In block 625, method 600 may include determining whether a vulnerability is detected in the second set of data. In doing so, the vulnerability scanner may inspect the second set of data to determine whether the vulnerability exists in the second set of data. For example, in the case of the email header injection, if the second set of data, when inspected, indicates that the header section has been indeed modified by the header injection attack to include the injected recipient (e.g., that the additional recipient appears in the header section), it may be determined that a vulnerability against the email header injection is detected. In the case of the email command injection, if the second set of data indicates that the injected command has been executed in the email server, a vulnerability against the email command injection may be detected.

Referring back to FIG. 2, vulnerability test engine 251 may be responsible for implementing block 621. API calls monitor engine 261 may be responsible for blocks 622-623. Test result request receipt engine 262 may be responsible for implementing block 624. Vulnerability detect engine 254 may be responsible for implementing block 625.

The foregoing disclosure describes a number of example implementations for detection of email-related vulnerabilities. The disclosed examples may include systems, devices, computer-readable storage media, and methods for detection of email-related vulnerabilities. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method comprising:
scanning by a vulnerability scanner, a first set of data, wherein the first set of data is collected by a runtime agent, and corresponds to a first application programming interface (API) call made by an application in response to the application receiving a request to send an email, read an email, or open a connection with an email server, and wherein scanning the first set of data comprises identifying a vulnerability in the first set of data to email injection;
generating an email injection-based hacking attack based on the vulnerability identified in the first set of data, wherein the hacking attack causes the application to generate a second API call;
monitoring, by the runtime agent, a plurality of application programming interface (API) calls made by the application for a set of API calls of the plurality of API calls related to at least one of a plurality of email protocols, wherein the set of API calls comprises the first API call and the second API call;
identifying, by the runtime agent, the second API call;
retrieving, by the runtime agent, a second set of data corresponding to the second API call; and
determining, by the vulnerability scanner, whether a vulnerability is detected in the second set of data.

2. The method of claim 1, wherein the hacking attack comprises at least one of:
a header injection attack that manipulates a header section of a raw email, wherein the first set of data comprises the raw email; or
a command injection attack that injects a command into the request to the application to execute the command in the email server.

3. The method of claim 1, wherein scanning, by the vulnerability scanner, comprises at least one of:
inspecting, by the vulnerability scanner, a body section of the first set of data that comprises a raw email to determine whether the vulnerability is present in the body section of the raw email; or
inspecting, by the vulnerability scanner, the first set of data comprising information related to a request to open a connection with the email server to determine whether the connection is insecure.

4. The method of claim 1, wherein determining whether a vulnerability is detected comprises the vulnerability scanner automatically testing the application for security vulnerabilities, without access to source code used to build the application.

5. A non-transitory machine-readable storage medium storing instructions that, when executed by a processor, cause the processor to:
- scan a first set of data, wherein the first set of data is collected by a runtime agent, and corresponds to a first application programming interface (API) call made by an application in response to the application receiving a request to send an email, read an email, or open a connection with an email server, and wherein scanning the first set of data comprises identifying a vulnerability in the first set of data to email injection;
- generate an email injection-based hacking attack based on the vulnerability identified in the first set of data, wherein the hacking attack causes the application to generate a second API call;
- monitor, by the runtime agent, a plurality of API calls made by the application for a set of API calls of the plurality of API calls related to at least one of a plurality of email protocols, wherein the set of API calls comprises the first API call and the second API call;
- receive, from the runtime agent, a second set of data corresponding to the second API call; and
- determine whether a vulnerability is detected in the second set of data.

6. The non-transitory machine-readable storage medium of claim 5, wherein the instructions, when executed by the processor, further cause the processor to:
- generate a first injection attack that, when the first injection attack is successful, modifies a header section of the first set of data, wherein the first set of data includes an outgoing message; or
- generate a second injection attack that, when the second injection attack is successful, causes an email server to execute a set of commands that have been injected into an application request.

7. The non-transitory machine-readable storage medium of claim 5, wherein the instructions, when executed by the processor, further cause the processor to:
- inspect a body section of the second set of data that comprises an outgoing message or an incoming message to determine whether sensitive information that is unprotected is included in the body section of the outgoing message or the incoming message; and
- inspect the second set of data that comprises information related to an application request to open a connection with an email server to determine whether the connection is insecure.

8. The non-transitory machine-readable storage medium of claim 5, wherein the instructions are executable by the processor to detect a vulnerability in the first set of data without accessing source code used to build a server-based application.

9. A system comprising:
a processor; and
a memory to store instructions that, when executed by the processor, cause the processor to:
- scan a first set of data, wherein the first set of data is collected by a runtime agent, and corresponds to a first application programming interface (API) call made by an application in response to the application receiving a request to send an email, read an email, or open a connection with an email server, and wherein scanning the first set of data comprises identifying a vulnerability in the first set of data to email injection;
- generate an email injection-based hacking attack based on the vulnerability identified in the first set of data, wherein the hacking attack causes the application to generate a second API call;
- monitor, by the runtime agent, a plurality of API calls made by the application for a set of API calls of the plurality of API calls related to at least one of a plurality of email protocols, wherein the set of API calls comprises the first API call and the second API call;
- receive, from the runtime agent, a second set of data corresponding to the second API call; and
- determine whether a vulnerability is detected in the second set of data.

10. The system of claim 9, wherein the instructions, when executed by the processor, further cause the processor to:
- perform an injection attack that injects an additional recipient into a header section of an outgoing email, wherein the first set of data comprises the outgoing email; and
- inspect the header section of the second set of data to determine whether the additional recipient appears in the header section of the second set of data.

11. The system of claim 9, wherein the instructions, when executed by the processor, further cause the processor to:
- perform an injection attack that injects a command into an application request made to a server-based application, wherein the first set of data comprises the application request; and
- determine whether the injected command has been executed in an email server.

12. The system of claim 9, wherein the instructions, when executed by the processor, further cause the processor to:
- inspect a body of the first set of data that comprises an email message to determine whether sensitive information that is unencrypted is found in the body of the email message.

13. The system of claim 9, wherein the instructions, when executed by the processor, further cause the processor to automatically test a server-based application for security vulnerabilities, without access to source code used to build the server-based application.

* * * * *